United States Patent Office 3,138,636
Patented June 23, 1964

3,138,636
ANTHRANILIC ACID DERIVATIVES
Robert A. Scherrer, Ann Arbor, Mich., assignor to Parke, Davis & Company, Detroit, Mich., a corporation of Michigan
No Drawing. Filed June 23, 1960, Ser. No. 38,097
6 Claims. (Cl. 260—501)

The present invention relates to novel anthranilic acids having useful pharmacodynamic properties and to methods for producing same. More particularly, the present invention relates to anthranilic acids and salts thereof said anthranilic acids having in their free acid form the formula

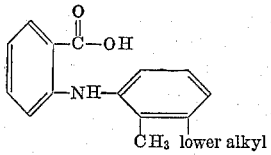

The compounds wherein "lower alkyl" is methyl or ethyl possess exceptionally high activity and are preferred compounds of the invention.

In accordance with the invention, the novel compounds of the above formula and their salts are produced by condensing a benzoic acid derivative of the formula

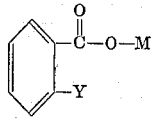

with a compound of the formula

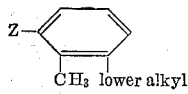

where M represents hydrogen or an alkali metal, preferably potassium; Y represents —NH$_2$ or halogen; and Z represents —NH$_2$ or halogen, with the added proviso that when one of Y and Z is halogen the other of Y and Z is —NH$_2$. Bromine is a preferred halogen substituent. The reaction is preferably carried out in the presence of a copper-containing catalyst and a proton acceptor. In carrying out this condensation it is generally satisfactory to employ substantially equivalent quantities of the reactants in the presence of a suitable solvent. Some solvents suitable for this purpose are N,N-dimethylformamide, bis(2-methoxyethyl)ether, dimethyl sulfoxide, nitrobenzene, and lower aliphatic alcohols such as n-butanol, isoamyl alcohol and the like. Preferred solvents are N,N-dimethylformamide, and bis(2-methoxyethyl)ether. In general, the reaction is favored by temperatures in excess of 75° C. and preferably carried out in the range from 100° C. to 200° C.

Some examples of suitable copper-containing catalysts for this purpose are various forms of mechanically divided or chemically precipitated metallic copper such as e.g. powdered copper or spongy copper and various copper-containing compounds such as cuprous bromide, cuprous chloride, cupric acetate, cupric carbonate, cupric oxide, cupric sulfate and the like. Cupric bromide and cupric acetate are preferred catalysts.

The quantity of the proton acceptor employed in the reaction can be varied within wide limits. In general, the proton acceptor should preferably be added in at least that amount required to bind the benzoic acid reactant and the hydrohalic acid formed in the course of the reaction. Examples of suitable proton acceptors when benzoic acid derivatives of the above formula are employed in free acid form are alkali metal carbonates, preferably potassium carbonate; cupric carbonate; cuprous carbonate and the like. When an alkali metal, and preferably potassium salt of the benzoic acid reactant is employed, calcium hydride, alkali metal carbonates such as e.g. potassium carbonate, and tertiary organic amines such as e.g. N-ethylmorpholine are examples of suitable proton acceptors.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

The compounds of the invention can also be prepared by hydrolysis of an N-acylated anthranilic acid derivative of the formula

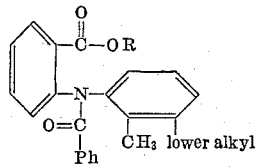

wherein R represents hydrogen or an organic radical such as e.g. lower alkyl and preferably the methyl radical, and Ph represents an aryl radical, preferably phenyl or phenyl substituted by halogen, nitro, lower alkyl, or lower alkoxy groups. The hydrolysis is preferably effected in an alkaline medium by dissolving the starting materials in a water-miscible unreactive organic solvent such as ethanol or methanol, adding a large excess of concentrated aqueous solution of sodium or potassium hydroxide and allowing the hydrolysis to proceed (with or without stirring) until the reaction is complete. The hydrolysis is favored by temperatures in excess of 75° C. and is preferably effected at temperatures ranging from 75° C. to about 150° C.

The N-acylated anthranilic acid derivatives of the above formula employed as starting materials in this process can be produced by reacting a benzimidoyl chloride of the formula

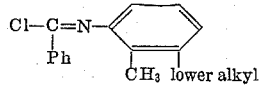

with a salicylate of the formula

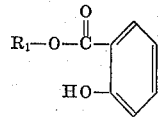

or an alkali metal salt thereof to give an imidoester of the formula

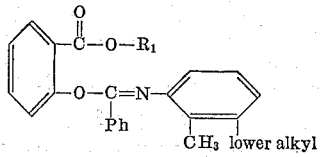

and heating said imidoester to cause an intramolecular rearrangement, optionally subjecting the reaction mixture to mild hydrolysis, preferably in a basic medium, to give the desired N-acylated anthranilic acid derivatives of the above formula. In the above formulas Ph has the hereinbefore mentioned significance and $R_1$ represents an organic radical, preferably lower alkyl.

The condensation of the benzimidoyl chloride with the salicylates or the alkali metal salts thereof is conveniently carried out in a non-reactive solvent medium. In carrying out this reaction it is generally satisfactory to employ substantially equivalent quantities of the reactants. When the salicylate reactant is employed in its free hydroxyl form, the condensation is conducted in the presence of a proton acceptor. The reaction is advantageously carried out in a mixture of ethyl ether and ethanol or methanol in the presence of a base such as e.g. sodium ethylate or sodium methylate. Alternatively, the condensation can be effected in a bis(2-methoxyethyl)-ether medium in the presence of sodium hydride as proton acceptor. The reaction mixture should contain sufficient base to bind the hydrohalic acid formed in the course of the reaction.

The intramolecular rearrangement of the imidoester is favored by temperatures in excess of 150° C. and preferably effected at temperatures ranging from 200° C. to about 270° C.

The benzimidoyl chlorides of the above formula can be conveniently prepared by reacting an anilide of the formula

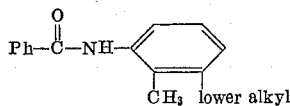

with an excess of phosphorus pentachloride at elevated temperatures. The reaction is favored by temperatures ranging from about 80° C. to about 115° C. In the above formula Ph has the aforementioned significance.

The compounds of the invention possess antipyretic, anti-nociceptive and anti-inflammatory activity, have a surprisingly low degree of toxicity and are of value in mitigating the symptoms associated with rheumatic, arthritic and other inflammatory conditions. They are preferably administered by the oral route. Either the free acids or pharmaceutically-acceptable salts formed with a variety of inorganic and organic bases can be used. Some typical examples of these salts are the sodium, potassium, calcium, ammonium, choline, 2-hydroxyethylamine, bis(2-hydroxyethyl)amine, tris(2-hydroxyethyl)amine and like salts. Preferred salts are the pharmaceutically-acceptable salts of an alkali metal, an alkaline earth metal, ammonia, or a substituted ammonia. The salts or free acids of the invention can be combined with either a solid or liquid carrier or diluent and made available in varying amounts in such conventional vehicles as tablets, capsules, powders, aqueous and non-aqueous suspensions and solutions, or other pharmaceutical forms suitable for oral administration.

The invention is illustrated, but not limited, by the following examples:

*Example 1*

A mixture of 800 g. of potassium o-bromo-benzoate, 1500 ml. of bis(2-methoxyethyl)ether, 355 g. of N-ethylmorpholine, 375 g. of 2,3-dimethylaniline, and 30 g. of cupric acetate is heated gradually with stirring to 140° C. over a period of 90 minutes. The hot reaction mixture is then acidified with 260 ml. of concentrated hydrochloric acid and the acidified mixture divided into 2 equal portions. One liter of water is added to each portion and the mixtures allowed to cool. The N-(2,3-dimethylphenyl)anthranilic acid which separates upon cooling is collected by filtration and recrystallized from bis(2-methoxyethyl)ether; M.P. 229–230° C. (corr.).

*Example 2*

A stirred mixture of 35.8 g. of potassium o-bromobenzoate, 75 ml. of bis(2-methoxyethyl)ether, 20.2 g. of 2-methyl-3-ethylaniline, 20 ml. of N-ethylmorpholine and 1.5 g. of cupric bromide is heated at about 140° C. for one hour. 15 ml. of concentrated hydrochloric acid is then added to the hot reaction mixture. The morpholine hydrochloride which separates is collected by filtration and 180 ml. of water added portionwise to the filtrate. The aqueous solution is then cooled to 0–5° C. The N-(2-methyl-3-ethylphenyl)anthranilic acid which separates upon cooling is collected by filtration and dried, and recrystallized from bis(2-methoxyethyl)ether.

The 2-methyl-3-ethylaniline employed as starting material in the above procedure can be prepared in the following manner: A mixture of 132.5 g. of 2-iodo-6-nitrotoluene and 90 g. of ethyl iodide in absolute ether is added portionwise to a suspension of 46 g. of finely dispersed metallic sodium in absolute ether. After the addition is complete, 23 g. of finely divided sodium in absolute ether is added to the reaction mixture. The reaction mixture is then allowed to react for an additional half hour and then heated at reflux for an additional hour. The reaction mixture is cooled to room temperature and ethanol added and the mixture allowed to stand until the excess sodium is decomposed. The reaction mixture is washed with water, dried and the 2-nitro-6-ethyltoluene collected by distillation at reduced pressure.

33.0 g. of the nitro compound is brought to a vigorous boil with 100 ml. of methanol and 2 ml. of concentrated hydrochloric acid. 34 g. of iron filings are added in four parts at intervals of five minutes. The vigorous boiling and stirring is continued for an additional 2½ hours after the last addition of the iron. The hydrochloric acid is neutralized exactly with alcoholic sodium hydroxide and the neutral solution filtered while hot. The filter cake is washed with methanol and the methanol removed by distillation from the combined filtrates. The residue is taken up in aqueous hydrochloric acid and the non-basic materials removed by steam distillation from the aqueous acidic mixture. The 2-methyl-3-ethylaniline is liberated from the hydrochloride salt by the addition of sodium hydroxide and extracted with ether. The ethereal solution is dried, the ether removed by distillation and the residue fractionated under reduced pressure.

*Example 3*

A mixture of 45.0 g. of the potassium salt of anthranilic acid, 37.0 g. of 1,2-dimethyl-3-bromobenzene, 4.5 g. of calcium hydride and 4 g. of cupric acetate in 100 ml. of dimethyl sulfoxide is heated gradually with stirring to around 150° C. and maintained between 130 and 150° C. for 3 hours. The reaction mixture is diluted with an equal volume of water, 20 ml. of 2 N sodium hydroxide is added, and the mixture is extracted with several portions of ether. The aqueous residue is acidified with concentrated hydrochloric acid and the N-(2,3-dimethylphenyl)anthranilic acid which separates is collected by filtration, digested with several portions of boiling water and recrystallized from absolute ethanol; M.P. 229–230° C.

By substituting 39.8 g. of 2-chloro-6-ethyltoluene for the 37.0 g. of 1,2-dimethyl-3-bromobenzene in the above example, N-(2-methyl-3-ethylphenyl)anthranilic acid is obtained.

*Example 4*

A mixture of 25.0 g. of N-(2,3-dimethylphenyl)-N-benzoylanthranilic acid methyl ester, 250 ml. of ethanol, 10.0 g. of sodium hydroxide and 20.0 ml. of water is refluxed for 2 hours. 150 ml. of the solvent is distilled from the reaction mixture and a solution of 60.0 g. of sodium hydroxide dissolved in 100 ml. of water is added. The hydrolysis mixture is heated an additional 2 hours and the remaining ethanol solvent removed by distillation. The aqueous residue is acidified with concentrated hydrochloric acid and cooled. The precipitate which forms on cooling is collected by filtration and digested with several portions of boiling water. The residue is dissolved in a minimum quantity of hot bis(2-methoxyethyl)ether and allowed to cool. The N-(2,3-dimethylphenyl)anthranilic acid which separates upon cooling is collected by filtration and dried in vacuo at 60° C.; M.P. 228–229° C.

By substituting 25.0 g. of N-(2-methyl-3-ethylphenyl)-N-(p-chlorobenzoyl)anthranilic acid for the 25.0 g. of N-(2,3-dimethylphenyl)-N-benzoylanthranilic acid in the above procedure, N-(2-methyl-3-ethylphenyl)anthranilic acid is obtained.

The N-(2,3-dimethylphenyl)-N-benzoylanthranilic acid methyl ester employed as starting material in the above procedure can be prepared in the following manner: 15.2 g. of methyl salicylate and a solution of 24.3 g. of N-(2,3-dimethylphenyl)benzimidoyl chloride in dry ether are added in rapid succession to a solution of sodium ethoxide prepared from 2.3 g. of sodium and 200 ml. of absolute ethanol. The reaction mixture is shaken vigorously for 30 minutes and then allowed to stand at room temperature for 48 hours. The solvent is evaporated in vacuo, the residue diluted with water and the aqueous mixture extracted with several portions of ether. The ethereal solution is washed successively with aqueous sodium carbonate and with water, dried and the ether solvent removed by distillation in vacuo. The crude imido ester is then heated in a nitrogen atmosphere at 225–245° C. for about 90 minutes and the resulting product is dissolved in ethanol and treated with activated charcoal. The N-(2,3-dimethylphenyl)-N-benzoylanthranilic acid methyl ester may be utilized without further purification.

The N-(2,3-dimethylphenyl)benzimidoyl chloride used in the above procedure can be prepared as follows: A mixture of 32.0 g. of 2′,3′-dimethylbenzanilide and 36.0 g. of powdered phosphorus pentachloride is heated on a steam bath for one half hour. The phosphorus oxychloride which forms in the course of the reaction is removed by evaporation in vacuo and the residue treated with petroleum ether (B.P. 60–80° C.; dried over sodium) and the petroleum ether distilled off to remove final traces of phosphorus chlorides. The residue is refluxed with about 300 ml. of petroleum ether for 30 minutes and the solution decanted from insoluble material. Evaporation of the petroleum ether solvent in vacuo yields the N-(2,3-dimethylphenyl)benzimidoyl chloride which can be used without further purification.

*Example 5*

10.0 g. of sodium carbonate is added portionwise to a suspension of 20.0 g. of N-(2,3-dimethylphenyl)anthranilic acid in 300 ml. of methanol heated on a steam bath. The resulting solution is filtered from the excess solid sodium carbonate and the filtrate evaporated to dryness. The sodium salt of N-(2,3-dimethylphenyl)anthranilic acid is ground in a mortar and dried in vacuo at 100° C. If desired, the salt may be recrystallized from a small portion of ethanol or water.

The following salts can be prepared in the manner described from the corresponding anthranilic acid and alkali metal carbonate:

N-(2-methyl-3-ethylphenyl)anthranilic acid sodium salt
N-(2,3-dimethylphenyl)anthranilic acid potassium salt

*Example 6*

2.65 g. of choline chloride dissolved in ethanol is added to an ethanolic solution of 5 g. of the sodium salt of N-(2,3-dimethylphenyl)anthranilic acid. The mixture is heated to about 70° C. for 5 to 10 minutes. The sodium chloride which forms in the course of the reaction is removed by filtration and the filtrate concentrated in vacuo to give a clear oily residue from which the N-(2,3-dimethylphenyl)anthranilic acid choline salt crystallizes on standing.

*Example 7*

A mixture of 2.65 g. of choline chloride and 5 g. of the sodium salt of N-(2-methyl-3-ethylphenyl)anthranilic acid in ethanol is heated to about 70° C. for 5 to 10 minutes. The sodium chloride which forms in the course of the reaction is removed by filtration and the filtrate concentrated in vacuo to give a clear oily residue from which the N-(2-methyl-3-ethylphenyl)anthranilic acid choline salt crystallizes on standing.

What is claimed is:
1. A compound selected from the group consisting of a free acid and salts thereof with pharmaceutically-acceptable cations, said free acid having the formula

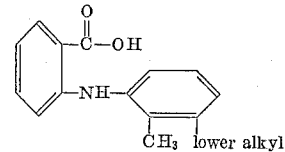

2. N-(2,3-dimethylphenyl)anthranilic acid.
3. N-(2-methyl-3-ethylphenyl)anthranilic acid.
4. N-(2,3-dimethylphenyl)anthranilic acid sodium salt.
5. N-(2,3-dimethylphenyl)anthranilic acid choline salt.
6. N-(2-methyl-3-ethylphenyl)anthranilic acid choline salt.

References Cited in the file of this patent
UNITED STATES PATENTS
2,006,735    Fischer _____ July 2, 1935

OTHER REFERENCES
Beilstein: "Organische Chemi" Band 14, p. 331 (1931).